(12) United States Patent
Saxe

(10) Patent No.: US 6,522,446 B2
(45) Date of Patent: *Feb. 18, 2003

(54) ANISOMETRICALLY SHAPED METAL PARTICLES, LIQUID SUSPENSIONS AND FILMS THEREOF AND LIGHT VALVES COMPRISING SAME

(75) Inventor: Robert L. Saxe, New York, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/841,853

(22) Filed: Apr. 25, 2001

(65) Prior Publication Data

US 2002/0159125 A1 Oct. 31, 2002

(51) Int. Cl.⁷ ............ G02B 26/00; G02F 1/03; G02F 1/00; G02F 1/29; F21V 9/00
(52) U.S. Cl. ............ 359/237; 359/245; 359/252; 359/318; 359/322; 252/585
(58) Field of Search .............. 359/237, 245, 359/247, 253, 318, 257, 258, 259, 296, 322; 252/585

(56) References Cited

U.S. PATENT DOCUMENTS

| | | | |
|---|---|---|---|
| 2,041,138 A | 5/1936 | Land | 18/57 |
| 2,178,996 A | 11/1939 | Land | 252/6 |
| 4,164,365 A | 8/1979 | Saxe | 399/296 |
| 4,247,175 A | 1/1981 | Saxe | 359/296 |
| 4,273,422 A | 6/1981 | Saxe | 359/296 |
| 4,407,565 A | 10/1983 | Saxe | 359/296 |
| 4,877,313 A | 10/1989 | Saxe et al. | 359/296 |
| 5,002,701 A | 3/1991 | Saxe | 252/586 |
| 5,093,041 A | 3/1992 | Check, III et al. | 252/585 |
| 5,124,075 A | 6/1992 | Yasuda et al. | 252/511 |
| 5,279,773 A | 1/1994 | Saxe | 252/585 |
| 5,409,734 A | 4/1995 | Lee et al. | 427/163.1 |
| 5,463,491 A | 10/1995 | Check, III | 359/296 |
| 5,463,492 A | 10/1995 | Check, III | 359/296 |
| 5,516,463 A | 5/1996 | Check, III et al. | 252/585 |
| 5,650,872 A * | 7/1997 | Saxe et al. | 359/296 |
| 5,707,916 A | 1/1998 | Snyder et al. | 502/180 |

OTHER PUBLICATIONS

"Wires For a Nanoworld", Chemical & Engineering News, Jan. 1, 2001, pp. 28–29.

"Scientists Belt Out a Novel Nanostructure", Science News, vol. 159, Mar. 10, 2001, p. 149.

* cited by examiner

*Primary Examiner*—Georgia Epps
*Assistant Examiner*—Omar Hindi
(74) *Attorney, Agent, or Firm*—Cooper & Dunham LLP

(57) ABSTRACT

The invention is directed to the use of anisometrically shaped metal particles in liquid light valve suspensions, light valve films and light valves. The anisometric metal particles may have various geometric shapes including, for example, fibrils, and an average length in the range between about 1 micron and 50 nanometers.

43 Claims, No Drawings

ANISOMETRICALLY SHAPED METAL PARTICLES, LIQUID SUSPENSIONS AND FILMS THEREOF AND LIGHT VALVES COMPRISING SAME

FIELD OF THE INVENTION

The present invention relates in general to particles of improved stability for use in SPD light valves and in SPD light valve suspensions and films and, more specifically, to anisometrically shaped metal particles useful for such applications.

BACKGROUND OF THE INVENTION

Light valves have been known for over sixty years for the modulation of light. As used herein, the term "light valve" is defined as a cell formed of two walls that are spaced apart by a small distance, at least one wall being transparent, the walls having electrodes thereon usually in the form of transparent conductive coatings. The cell contains a light-modulating element, which may be either a liquid suspension of particles or a plastic film in which droplets of a liquid suspension of particles are distributed and encapsulated.

The liquid suspension (sometimes herein referred to as "a liquid light valve suspension" or simply a "light valve suspension") comprises small particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices," or "SPDs".

Light valves have been proposed for use in numerous applications including, e.g., alpha-numeric displays, television displays, windows, sunroofs, sunvisors, filters, mirrors, eyeglasses and the like to control the amount of light passing therethrough or reflected therefrom, as the case may be.

For many applications, as would be well understood in the art, it is preferable for the activatable material, i.e., the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging associated with a high column of liquid suspension, can be avoided through use of a film, and the risk of possible leakage can also be avoided. Another advantage of using a plastic film is that, in a plastic film the particles are generally present only within very small droplets and, hence, do not noticeably agglomerate when the film is repeatedly activated with a voltage.

The term, "light valve film" as used herein refers to a film having droplets of a liquid suspension of particles distributed in the film.

U.S. Pat. No. 5,409,734 exemplifies a type of light valve film that is made by phase separation from a homogeneous solution. Light valve films made by cross-linking emulsions are also known. See U.S. Pat. Nos. 5,463,491 and 5,463,492, both of which are assigned to the assignee of the present invention.

For use in set suspensions such as light-polarizing sheets, sometimes called "sheet polarizers", which can be cut up and formed into polarized sunglass lenses or used as filters, light-polarizing particles can be dispersed or distributed throughout a sheet of suitable film-forming material, such as cellulose acetate, polyvinyl alcohol or the like. Methods of making set suspensions for use in sheet polarizers are well known in the prior art. It is important to note, however, that the light-polarizing particles used in light-polarizing sheets are immovable, i.e., fixed. See, e.g., U.S. Pat. Nos. 2,178,996 and 2,041,138.

The following is a brief description, for the sake of illustration, of the components of a light valve suspension.

1. Liquid Suspending Media and Stabilizers

A liquid light valve suspension for use in the present invention may be any liquid light valve suspension known in the art and may be formulated according to techniques well known to one skilled in the art. The term "liquid light valve suspension" means, as noted above, a "liquid suspending medium" in which a plurality of small particles is dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspensions useful in the present invention may include any of the liquid suspending media previously proposed for use in light valves for suspending the particles. Liquid suspending media known in the art which are useful in the invention include, but are not limited to, the liquid suspending media disclosed in U.S. Pat. Nos. 4,247,175 and 4,407,565. In general, one or both of the liquid suspending medium or the polymeric stabilizer dissolved therein is chosen so as to maintain the suspended particles in gravitational equilibrium.

The polymeric stabilizer, when employed, can be a single type of solid polymer that bonds to the surface of the particles but which also dissolves in the non-aqueous liquid or liquids of the liquid suspending medium. Alternatively, two or more solid polymeric stabilizers may serve as a polymeric stabilizer system. For example, the particles can be coated with a first type of solid polymeric stabilizer such as nitrocellulose which, in effect, provides a plain surface coating for the particles. The coated particles are thereafter re-coated with one or more additional types of solid polymeric stabilizer that bond to or associate with the first type of solid polymeric stabilizer and which also dissolves in the liquid suspending medium to provide dispersion and steric protection for the particles. Liquid polymeric stabilizers may also be used to advantage, especially in SPD light valve films, as described in U.S. Pat. No. 5,463,492.

2. Particles

Inorganic and organic particles may be used in a light valve suspension, and such particles may be either light-absorbing or light-reflecting.

Conventional SPD light valves have generally employed polyhalide particles of colloidal size. The term "colloidal" as used herein means that the particles generally have a largest dimension averaging about 1 micron or less. Preferably, the largest dimension of most of the particles used in a light valve suspension should be less than one-half of the wavelength of blue light, i.e., 2000 Angstroms or less, to keep light scatter extremely low. As used herein, the term "anisometric," which refers to particle shape, means that at least one dimension of a particle is larger than another dimension, e.g., the particle length is greater than its width.

A detailed review of prior art polyhalide particles can be found in "The Optical Properties and Structure of Polyiodides" by D. A. Godina and G. P. Faerman published in The Journal of General Chemistry, U.S.S.R. Vol. 20, pp. 1005–1016 (1950).

Herapathite, for example, is a quinine bisulfate polyiodide, and its formula is given under the heading quinine iodosulfate as $4C_{20}H_{24}N_2O_2.3H_2SO_4.2HLI_4 \ .6H_2O$ in The Merck Index, $_{10}$ Ed. (Merck & Co., Inc., Rahway, N.J.). In polyiodide compounds, the iodide anion is thought to form chains and the compounds are strong light polarizers. See U.S. Pat. No. 4,877,313 and Teitelbaum et al. JACS 100 (1978), pp. 3215–3217. The term "polyhalide" is used herein to mean a compound such as a polyiodide, but wherein at least some of the iodide anion may be replaced by another halide anion. More recently, improved polyhalide particles for use in light valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium halide, alkali metal halide or alkaline earth metal halide.

For the particles to be commercially useful, however, whether or not the light valve suspension is incorporated into a film, it is necessary that the particles have great chemical and environmental stability. To obtain particles of great environmental stability, in turn, it may be desirable to use non-polyhalide particles in light valve suspensions and films, especially where the stability of the material composing the particles is known to be excellent.

The use of metal particles in light valves was first proposed in U.S. Pat. No. 1,963,496. Many types of metal particles are stable to UV radiation, as well as other environmental stresses. In addition, they are available in a variety of colors sometimes varying in color as a function of particle size. However, prior art metal particles are of a relatively large size, and a disadvantage of employing the relatively large size prior art metal particles in liquid light valve suspensions or films is that such metal particles are prone to agglomerate rapidly when a light valve suspension containing them is activated. In addition, prior art metal particles are known to scatter an unacceptably large amount of light, and to settle due to gravity.

The use in a light valve suspension of particles produced by communication using conventional mechanical methods such as ball mills, attritors, bead mills and roll mills is usually not practical, however, for several important reasons. First, the particles, even after grinding, are usually too large, generally having an average size (diameter) of 1 micron or greater. Secondly, even if submicron sized particles are produced, the grinding and comminution process usually tends to make such particles spherical in shape or amorphous, reducing or virtually eliminating their aspect ratio, i.e., the ratio of length to width. For use in a light valve suspension anisometrically shaped particles which have an aspect ratio of at least about 3:1 and preferably 10:1 or more are important; hence particles shaped like needles, rods or plates and the like are generally necessary because their anisometric shape facilitates orientation in an electric or magnetic field and enables a substantial change in light transmission. Particles larger than 0.2 micron (one-half the wavelength of blue light) tend to scatter light, and such scattering increases exponentially with particle size. This fact and the fact that relatively large particles promote agglomeration, are additional reasons why such comminuted particles are usually not desirable for use in a light valve suspension.

Heretofore it has not been practical to obtain particles of a submicron size and anisometric shape having good optical properties, except for polyiodide particles. However, in some cases polyiodide particles may not be sufficiently stable to ultraviolet radiation, and light valve suspensions of such polyiodide particles may degrade in terms of color and performance if exposed to intense ultraviolet radiation for a prolonged period of time unless special measures are taken to protect against UV radiation, such as including UV absorbers in the light valve suspension or film, or using a UV filter to intercept UV radiation before it strikes the SPD. Also, nearly all polyiodide particles are limited to a blue color, whereas it is also desirable to have light valve suspensions which have off-state colors which are not blue. Accordingly, new types of particles for light valve suspensions are needed which will be suitably small and anisometrically shaped, which will tolerate high levels of ultraviolet radiation for long periods of time without significant degradation and/or which have a variety of off-state colors.

U.S. Pat. No. 5,650,872, assigned to the assignee of the present invention, provides an electro-optical device, such as a light valve, comprising a cell formed of opposed cell walls, a light-modulating unit comprising a suspension containing anisometric non-elemental particles such as pigments and pigment precursors prepared by the Evaporative Dispersion Process suspended in a liquid suspending medium between said cell walls, and opposed electrode means operatively associated with said cell walls for applying an electrical field across said suspension, the anisometric particles having an average particle size of about 0.2 microns or less. The particles disclosed by the reference are not, however, metal particles and thus its teachings are not applicable to the present invention.

The present invention overcomes the disadvantages noted above, of using conventional metal particles in light valve suspensions, the achievement of which becomes apparent from the discussion appearing below.

SUMMARY OF THE INVENTION

The present invention is directed, in a first embodiment, to an electro-optical device comprising a cell formed of opposed cell walls, a light-modulating unit comprising a suspension containing anisometrically shaped metal particles suspended in a liquid suspending medium between the cell walls, and opposed electrodes operatively associated with the cell walls for applying an electrical field across the suspension. The anisometrically shaped metal particles have an average length in the range between about 1 micron and 50 nanometers, preferably between about 200 nanometers and 50 nanometers, and most preferably between about 75–180 nanometers. In a further embodiment the anisometrically shaped metal particles have an aspect ratio, i.e., the ratio of length to width, of at least about 3:1, preferably at least about 10:1 and most preferably at least about 20:1.

In a preferred embodiment of the invention the electro-optical device as described above is a light valve, and the suspension is a light valve suspension. Alternatively, instead of a liquid suspension, the anisometric metal particles of the invention may be suspended in droplets of liquid suspending material distributed throughout a polymeric film.

The anisometrically shaped metal particles may be produced in a variety of physical forms including, but not limited to, fibrils, rods, cylinders, plates, needles, blades, and prisms. Typical metals of which the particles may be formed include, but are not limited to, gold, platinum, palladium, cobalt, iron, copper, molybdenum and bismuth. The particles typically have an average diameter ranging between about 3–333 nanometers, more preferably between about 3–66 nanometers. In addition to the forms noted above, the particles may also, if desired, be prepared in the form of a nanobelt. Such nanobelts are typically formed using, as a starting material, a semi-conducting metal oxide, e.g., tin oxide or zinc oxide.

Another embodiment of the invention involves the incorporation of a plurality of anisometrically shaped metal particles, having an average length of between about 50–200 nanometers, into a liquid light valve suspension in order to improve the performance of the light valve suspension. The particles may be in the shape of, e.g., fibrils, rods, cylinders, plates, needles, blades or prisms and should have an aspect ratio of at least about 3:1, preferably 10:1 and most preferably 20:1. The particles may be prepared from such metals as gold, platinum, palladium, cobalt, iron, copper, molybdenum and bismuth. Alternately, the particles may be prepared in the form of a nanobelt formed, e.g., using a semi-conducting metal oxide such as tin oxide or zinc oxide as a starting material. The anisometrically shaped metal particles for use with the subject embodiment of the invention may have an average diameter ranging from about 3–333 nanometers, and more preferably, from about 3 to about 66 nanometers.

In a further embodiment the invention is directed to a film suitable for use as the light modulating unit of an SPD light valve, the film comprising a cross-linked polymer matrix and having droplets of a liquid light valve suspension distributed in the cross-linked polymer matrix. The light valve suspension comprises a plurality of anisometrically shaped metal particles suspended in a liquid suspending medium. The anisometrically shaped metal particles have an average length of between about 50–200 nanometers. The particles may be produced from a variety of metals including, but not limited to gold, platinum, palladium, cobalt, iron, copper, molybdenum and bismuth, and in a variety of shapes, e.g., fibrils, rods, cylinders, plates, needles, blades and prisms. In an alternate embodiment, the particles may be produced in the form of a nanobelt from, e.g., a semi-conducing metal oxide such as tin oxide or zinc oxide. The particles for use in this embodiment may have an aspect ratio of at least about 3:1, preferably at least 10:1 and most preferably at least 20:1, and a diameter ranging from about 3 to about 333 nanometers.

An additional embodiment of the invention is directed to a method of preparing the anisometrically shaped particles for use in the invention. The method comprises forming a sheet or a film of a metal particle forming material and depositing the particle forming material onto a substrate. Thereafter, the sheet or film may be scored, as with a laser, to cut it up into particles of an appropriate size. If desired, the substrate upon which the sheet or film is deposited may be soluble in a given solvent and, after the formation of the particles, it may be solubilized away from the particle with the use of the solvent.

DETAILED DESCRIPTION OF THE INVENTION

The present invention is based on the discovery that suitably sized anisometric metal particles can be produced and used as the particles of a liquid light valve suspension, films and light valves. The metal particles used in the instant light valves can be formed from a variety of metals including, but not limited to, gold, platinum, palladium, cobalt, iron, copper, molybdenum and bismuth. These metal particles may be shaped in various geometric forms including, but not limited to, fibrils, rods, cylinders, plates, needles, blades, prisms and other shapes known in the art. The particular geometric form is not critical as long as the particles are anisometric. Metal particles of the type described herein are advantageous in a light valve suspension because their high electrical conductivity makes it possible to orient a given size and shape particle with less voltage than if a less conductive particle of the same size and shape were substituted for it.

Comminution may be used in the process of preparing the particles of the present invention to produce particles having a high aspect ratio if, prior to the comminution step, the starting materials to be comminuted have an extremely large aspect ratio, i.e., they are highly anisometric in shape. Comminution methods for use in forming the particles of the present invention would be well understood by one of ordinary skill in this art. A non-limiting example of such a starting material is a metal nanowire. Such nanowires can have diameters of 3 nanometers or larger and be many microns in length. When comminuted, the diameters tend to remain unchanged, with only the length being reduced.

The term "metal fibrils" (i.e., one "type" of metal particle useful in the present invention) as used herein means substantially cylindrical or filamentary discrete metal particles characterized by a substantially constant average diameter ranging from about 3.0 to about 333 nanometers and an average length of at least about three times the diameter, wherein the average length is about 1 micron or less and preferably 200 nanometers or less. They may be produced, for example, from the nanowires described above. Such filamentary metal particles, moreover, need not be precisely straight or cylindrical.

Methods of dispersing metal particles, such as metal fibrils, in liquids are also well known in the art. Generally, a polymer soluble in the liquid of the dispersion will bond to and disperse the metal particles of the present invention if the polymer has in its structure: (1) a sufficient number of polar groups to bond to the particles and (2) low polarity or non-polar groups to dissolve in the liquid suspending medium. Non-limiting examples of such low or nonpolar groups include alkyl and aryl hydrocarbon groups, and organosiloxane groups. The high polarity groups include, for example, groups such as ionomer, hydroxyl, carboxyl or alkylene oxide such as ethylene oxide. Surfactants and dispersants for use with metal particles are known in the art. See, also U.S. Pat. Nos. 4,164,365, 4,273,422 and 5,279,773, which are assigned to the assignee of the present invention, and describe suitable copolymers and polymeric dispersion systems for light valve suspensions.

As a practical matter, metal fibrils cannot be easily made with diameters less than about 3.0 nanometers. In order to keep light scatter very low in a light valve suspension, the fibrils' average lengths should be less than about 200 nanometers (one-half the wavelength of blue light). Preferably, no more than five percent of the particles in a suspension of the invention will have lengths of 200 nanometers or more; more preferably one percent or less of the particles will have lengths of 200 nanometers or more; and most preferably, 0.2% or less of the particles will have lengths of 200 nanometers or more.

On the other hand, if the particles, such as metal fibrils, have too small a length, a different problem arises. A suspension of very small length particles requires a relatively great amount of voltage to orient, whereas longer particles require less voltage because of their greater torque. Hence, as a practical matter, the particles should preferably have an average length of about 50 nanometers or more. A suspension of anisometric metal particles should preferably have five percent or less of its particles with lengths less than 50 nanometers; more preferably one percent or less of its particles will have lengths less than 50 nanometers; and most preferably 0.2% or fewer of its particles will have lengths less than 50 nanometers. Thus, the preferred length of the metal particles, e.g., metal fibrils, of the invention, should range between about 50–200 nanometers.

Useful in the instant invention are metal particles which are prepared in a manner such that anisometric materials having an aspect ratio of about 3:1 or greater, preferably about 10:1 or greater or more preferably of about 20:1 or greater are obtained. It is preferred that the particles have a thickness or diameter which is substantially smaller than the length or width of the particle. The particles useful in the present invention should be further dimensioned such that the largest possible dimension is an average of 1 micron or less and preferably an average of 200 nanometers or less. Preferably, the largest average dimension should range from about 50 to 200 nanometers, more preferably average from about 75 to about 180 nanometers.

Methods of making metallic nanowires are known in the art. For example, see "Wires for a Nanoworld" in *Chemical & Engineering News*, Jan. 1, 2001, pps. 28–29, which is incorporated in its entirety by reference herein. Such nanowires, if of an appropriate size, or if comminuted to reach an appropriate size as discussed hereinafter, are regarded for the purposes of the present invention as metal fibrils.

Nanowires are often produced with small diameters but with lengths of many microns. Such lengths are too long for use in a light valve suspension. A comminution process may be used to reduce the length of a nanowire particle if two of the three spatial dimensions of the particle are extremely small. For example, if cylindrically shaped or filament-shaped metal wires or fibrils have a very small average diameter e.g., 3–66 nanometers and an average length of 1 micron or more, the wires or fibrils can be comminuted by methods known in the prior art to have average lengths of 200 nanometers or less, without significantly affecting the particles' diameters. Preferably, however, comminution can be achieved by using a microtome with a suitably hard and sharp blade to slice a metal nanowire into metal fibrils having appropriately short lengths. To effectuate such slicing efficiently, a plurality of long wires are arranged, preferably parallel or nearly parallel to one another, and immobilized in a polymer such as (but not limited to) polystyrene, and then sliced perpendicular to their diameters with a microtome. The microtome can move slowly along the wire, slicing numerous wires at once at small intervals along the length of the wire. Afterwards the polymer in which the metal fibrils are immobilized can be removed with a solvent or any other convenient means, to free the metal fibrils.

In an alternate embodiment of the invention, particles that are too large in one or more dimensions, e.g., their length, may be cut down to size with, instead of a microtome, a laser, e.g., a gas, solid state, chemical or dye laser, operated at an approximate wavelength in consideration of the composition of the material to be cut, plus any encasing material, such as the polymer material described above. The appropriate wavelengths and the procedure for cutting the particular material would be well understood by one of ordinary skill in the field of lasers without the necessity for any undue experimentation. One well-known supplier of lasers which would be useful in the present invention is Lambda-Physik of Fort Lauderdale, Fla., which is affiliated with Coherent, Inc. of Santa Clara, Calif.

In another embodiment, the particle material may be produced in a sheet or film form, following which a laser may be used to scribe the sheet and thus form particles having appropriate dimensions from the sheet material. A particular non-limiting example would be the use of a metal, deposited upon a substrate, whereupon the supported sheet or film is thereafter cut into discreet particles of an appropriate size range with, e.g., a laser. If desired, the substrate may be formed of a soluble material so that, after cutting the sheet or film to form the particles, the substrate may be dissolved away from the particles using an appropriate solvent, leaving only the particles behind. The methods for the formation and laser-cutting of such sheets would be well known to those of ordinary skill in the relevant field of art.

In a still further embodiment of the invention, the particles may be prepared, e.g., in the form of a "nanobelt" as described in *Science News*, Vol. 159, p. 149 (Mar. 10, 2001). Such nanobelts may be formed using a variety of starting materials, including but not limited to semiconducting metal oxides, e.g., tin oxide and zinc oxide. They typically have a width ranging from about 30 to about 300 nanometers and a thickness in the range of about 10–15 nanometers. These ribbon-like structures may either be formed in an appropriate particle size, or else cut down to the desired size using, e.g., a microtome or laser as described above.

Particles of different sizes or size ranges may be separated from one another by known methods such as filtration and centrifuigation.

A dispersion of the metal particles of the present invention may be easily prepared by rapidly mixing them into any suitable light valve liquid e.g., isopentyl acetate or triethyl trimellitate in the presence of any suitable polymer which acts as a dispersant, such as those described in the prior art.

When a dispersion of the anisometric metal particles of the invention, such as (but not limited to) fibrils, is placed in a light valve and activated with an AC voltage, light transmission through the cell is observed to increase readily.

Each of the patents and other references noted herein is incorporated by reference into the present specification to the degree necessary to comprehend the invention.

It is to be understood that the present invention is not limited in scope by the exemplified embodiments which are intended as illustrations of single aspects of the invention, and embodiments and methods which are functionally equivalent are within the scope of the invention. Indeed, various modifications of the invention in addition to those described herein will become apparent to those skilled in the art from the foregoing description.

What is claimed is:

1. An electro-optical device comprising a cell formed of opposed cell walls, a light modulating unit comprising a suspension containing anisometrically shaped metal particles suspended in a liquid suspending medium between said cell walls and opposed electrodes operatively associated with said cell walls for applying an electrical field across said suspension, wherein said anisometrically shaped metal particles have an average length in a range between about 1 micron and 50 nanometers and an aspect ratio of at least about 3:1.

2. The device according to claim 1, wherein said electro-optical device is a light valve and said suspension is a light valve suspension.

3. The device according to claim 2, wherein said anisometrically shaped metal particles have an average length between about 50–200 nanometers.

4. The device according to claim 3, wherein said anisometrically shaped metal particles have an average length between about 75–180 nanometers.

5. The device according to claim 1, wherein said anisometrically shaped metal particles have an aspect ratio of at least about 10:1.

6. The device according to claim 5, wherein said anisometrically shaped metal particles have an aspect ratio of at least about 20:1.

7. The device according to claim 3, wherein said anisometrically shaped metal particles are in a form selected from the group consisting of rods, cylinders, plates, needles, blades and prisms.

8. The device according to claim 3, wherein said anisometrically shaped metal particles are metal fibrils.

9. The device according to claim 3, wherein said anisometrically shaped metal particles are prepared in the form of a nanobelt.

10. The device according to claim 9, wherein said anisometrically shaped metal particles are formed from a semi-conducting metal oxide.

11. The device according to claim 10, wherein said semi-conducting metal oxide is tin oxide or zinc oxide.

12. The device according to claim 2, wherein said anisometrically shaped metal particles are formed from a metal selected from the group consisting of gold, platinum, palladium, cobalt, iron, copper, molybdenum and bismuth.

13. The device according to claim 2, wherein said anisometrically shaped metal particles have an average diameter ranging from about 3 nanometers to about 333 nanometers.

14. The device according to claim 13, wherein said anisometrically shaped metal particles have an average diameter ranging from about 3 nanometers to about 66 nanometers.

15. The device according to claim 1, wherein said light modulating unit is a liquid suspension or a film.

16. In a liquid light valve suspension the improvement comprising a plurality of anisometrically shaped metal particles suspended therein, wherein said anisometrically shaped metal particles have an average length in a range between about 1 micron and 50 nanometers and an aspect ratio of at least about 3:1.

17. The suspension of claim 16, wherein said anisometrically shaped metal particles are metal fibrils.

18. The suspension of claim 16, wherein said anisometrically shaped metal particles are in a form selected from the group consisting of rods, cylinders, plates, needles, blades and prisms.

19. The suspension according to claim 16, wherein said anisometrically shaped metal particles are prepared in the form of a nanobelt.

20. The suspension according to claim 19, wherein said anisometrically shaped metal particles are formed from a semi-conducting metal oxide.

21. The suspension according to claim 16, wherein said anisometrically shaped metal particles are formed from a metal selected from the group consisting of gold, platinum, palladium, cobalt, iron, copper, molybdenum and bismuth.

22. The suspension according to claim 16, wherein said anisometrically shaped metal particles have an average diameter ranging from about 3 nanometers to about 333 nanometers.

23. A film suitable for use as the light modulating unit of an SPD light valve, said film comprising a cross-linked polymer matrix and having droplets of a liquid light valve suspension distributed in the cross-linked polymer matrix, said liquid light valve suspension comprising a plurality of anisometrically shaped metal particles suspended in a liquid suspending medium, wherein said anisometrically shaped metal particles have an average length between about 1 micron and 50 nanometers and an aspect ratio of at least about 3:1.

24. The film according to claim 23, wherein said anisometrically shaped metal particles are metal fibrils.

25. The film according to claim 23, wherein said anisometrically shaped metal particles are in a form selected from the group consisting of rods, cylinders, plates, needles, blades and prisms.

26. The film according to claim 23, wherein said anisometrically shaped metal particles are prepared in the form of a nanobelt.

27. The film according to claim 26, wherein said anisometrically shaped metal particles are formed from a semi-conducting metal oxide.

28. The film according to claim 23, wherein said anisometrically shaped metal particles are formed from a metal selected from the group consisting of gold, platinum, palladium, cobalt, iron, copper, molybdenum and bismuth.

29. The film according to claim 23, wherein said anisometrically shaped metal particles have an average diameter ranging from about 3 nanometers to about 333 nanometers.

30. A method of preparing anisometrically shaped metal particles for use in an electro-optical device, said particles having an average length in a range between about 1 micron and 50 nanometers, said method comprising forming a sheet or a film of a metal particle forming material by depositing said particle forming material on to a substrate and subsequently cutting said sheet or said film into said particles by scoring said sheet or said film with a laser.

31. The method of claim 30 wherein said substrate is soluble in a chosen solvent and wherein, after scoring with said laser, the particles are removed from the substrate by dissolving said substrate with the solvent.

32. A film suitable for use as the light modulating unit of an SPD light valve, said film comprising a polymer matrix and having droplets of a liquid light valve suspension distributed in the polymer matrix, said liquid light valve suspension comprising a plurality of anisometrically shaped metal particles suspended in a liquid suspending medium, wherein said anisometrically shaped metal particles have an average length between about 1 micron and 50 nanometers and an aspect ratio of at least about 3:1.

33. The film according to claim 32, wherein said anisometrically shaped metal particles have an average length between about 50–200 nanometers.

34. The film according to claim 32, wherein said anisometrically shaped metal particles have an aspect ratio of at least about 10:1.

35. The film according to claim 32, wherein said polymer matrix is cross-linked.

36. The film according to claim 32, wherein said anisometrically shaped metal particles are metal fibrils.

37. The film according to claim 32, wherein said anisometrically shaped metal particles are in a form selected from the group consisting of rods, cylinders, plates, needles, blades and prisms.

38. The film according to claim 32, wherein said anisometrically shaped metal particles are in the form of a nanobelt.

39. The film according to claim 38, wherein said anisometrically shaped metal particles are formed from a semi-conducting metal oxide.

40. A method of preparing anisometrically shaped metal particles for use in an electro-optical device, said particles having an average length in a range between about 1 micron and 50 nanometers, said method comprising providing a substrate of a metal-particle-forming material, wherein said substrate is highly anisometric in shape, and comminuting said substrate to form a plurality of said anisometrically shaped metal particles, said particles having an aspect ratio of at least about 3:1.

41. The method of claim 40 wherein said substrate is a sheet or a film of said metal-particle-forming material.

42. The method of claim 43 wherein said substrate is a metal nanowire.

43. The method of claim 45 wherein said nanowire is comminuted by slicing said nanowire with a microtome into metal fibrils having appropriate lengths.

* * * * *